United States Patent [19]

Weis

[11] 4,260,306
[45] Apr. 7, 1981

[54] ECCENTRIC BORING TOOL AND METHOD

[75] Inventor: Siegfried K. Weis, Byron Center, Mich.

[73] Assignee: C. L. Frost & Son, Inc., Grand Rapids, Mich.

[21] Appl. No.: 57,587

[22] Filed: Jul. 16, 1979

[51] Int. Cl.³ ............................................. B23C 3/28
[52] U.S. Cl. ................................... 409/200; 29/37 R; 408/72 R; 408/104; 409/191
[58] Field of Search .................. 29/37 R, 37 A, 38 R, 29/38 B, 56.5, 26 A, 27 C, 562, 57; 409/132, 191, 200; 408/72 R, 104; 82/35

[56] References Cited

U.S. PATENT DOCUMENTS

| | | | |
|---|---|---|---|
| 315,271 | 4/1885 | Gates | 82/15 |
| 728,013 | 5/1903 | Rich | 82/15 |
| 819,743 | 5/1906 | Dyer | 82/36 R |
| 1,618,583 | 2/1927 | Drissner | 29/37 R |
| 1,968,538 | 7/1934 | Rupple | 29/37 R |
| 2,014,805 | 9/1935 | Hinderliter | 166/55.3 |
| 2,166,923 | 7/1939 | Woodcock | 71/77 |
| 2,216,963 | 10/1940 | Sinclair | 166/55.3 |
| 2,222,307 | 11/1940 | Blood | 408/72 R |
| 2,243,147 | 5/1941 | Blood | 408/187 |
| 2,515,383 | 7/1950 | Sneva | 408/241 R |
| 2,729,991 | 1/1956 | Peterman | 408/158 |
| 2,821,874 | 2/1958 | Oliver | 82/36 R |
| 2,915,949 | 12/1959 | Novkov | 409/200 |
| 3,094,014 | 6/1963 | Bartolat | 82/2 R |
| 3,526,167 | 9/1970 | Escobedo | 409/200 X |

*Primary Examiner*—William R. Briggs
*Attorney, Agent, or Firm*—Price, Heneveld, Huizenga & Cooper

[57] ABSTRACT

An eccentric boring tool and method of forming a bore off center from the central axis of a workpiece are disclosed. The tool includes a tool holder nonrotatably supported relative to a workpiece and an outer housing supported for rotation with the workpiece and rotation relative to the tool holder. An eccentric supported within the housing mounts a bearing which in turn supports the tool holder. The eccentric rotates with the housing causing the longitudinal axis of the tool holder to orbit about the longitudinal axis of the workpiece. An end mill cutting tool is supported in the tool holder. A plurality of discs are supported in the forward end of the housing. The discs engage the workpiece, lock the housing to the workpiece and cause the housing to rotate at the same speed as the workpiece.

15 Claims, 9 Drawing Figures

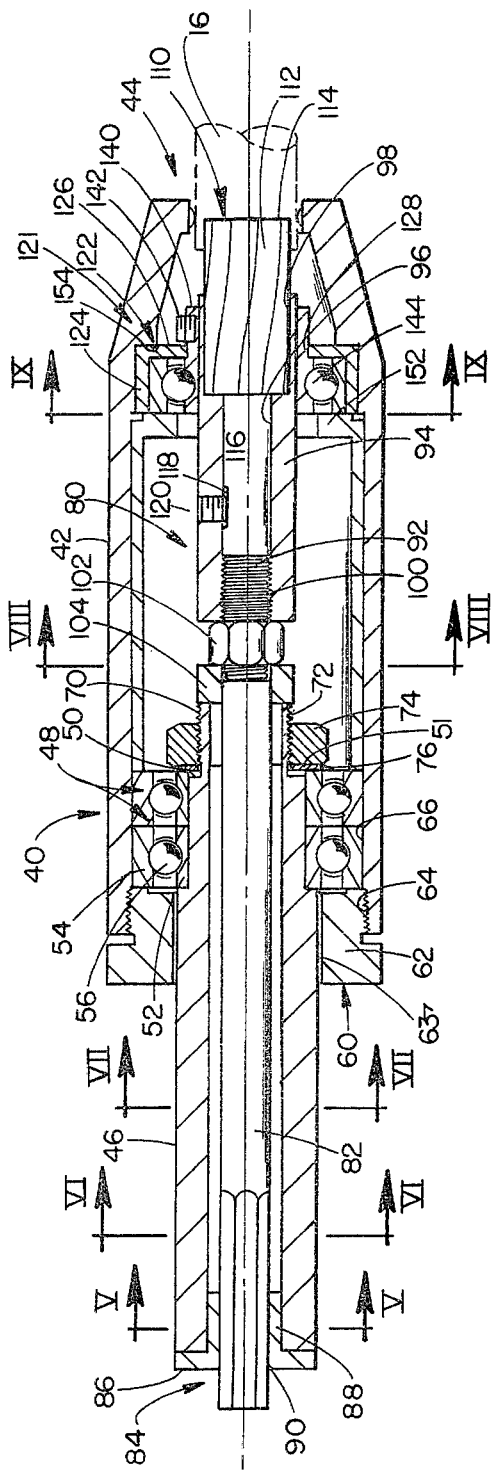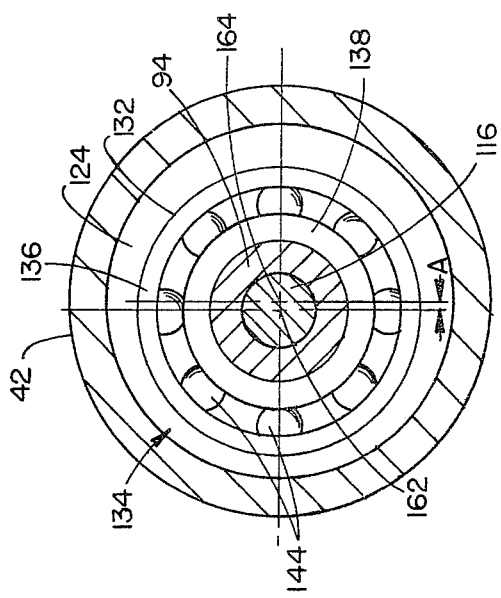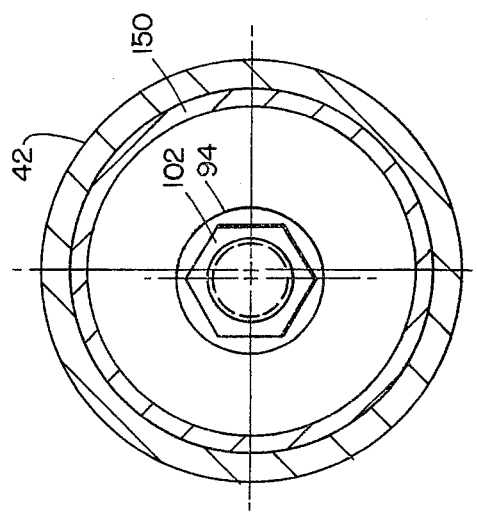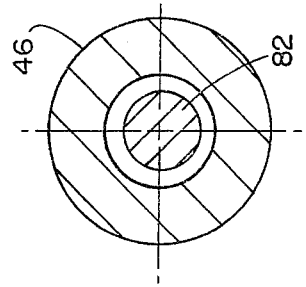

ECCENTRIC BORING TOOL AND METHOD

BACKGROUND OF THE INVENTION

The present invention relates to machining tools and more particularly to a unique tool and method for forming a bore offset with respect to the axis of a workpiece.

A wide variety of tools and apparatus are presently available for performing various machining operations on metal workpieces. One type of presently available apparatus is commonly referred to as an automatic bar and chucking machine or an automatic screw machine. This form of machine simultaneously performs machining operations on a plurality of individual workpieces. Such apparatus typically includes a plurality of spindles arranged radially about a main tool slide. Bar stock is held at each spindle and rotated during machining. An end working tool is aligned with each spindle and mounted on the main tool slide. The main tool slide may be tooled for drilling, boring or turning. The spindles are supported on a carrier which is indexed to permit the different tooling steps to be performed on each workpiece. A complete part is typically produced upon each cycle of operation of the spindle carrier. The machining tools are aligned coaxially with the bar stock workpieces.

In the fabrication of certain metal parts, it is necessary to form outer and inner annular surfaces such as holes, bores, counterbores, recesses, or the like, which have a center offset from the center of the workpiece. An example of one such part with an offset bore may be found in commonly owned U.S. patent application Ser. No. 057,588 entitled FASTENING APPARATUS AND METHOD FOR ASSEMBLING SAME and filed on even date herewithin the name of the present inventor. This application discloses a bearing and bracket assembly employing an eccentric interlock. An element of the bearing inner race includes a hub having a threaded centrally disposed aperture and an eccentrically located circular recess or counterbore.

Heretofore, automatic screw machines have not been used to completely machine the eccentric interlock elements. Such machines, while capable of turning the outer surface of a workpiece and forming a coaxially aligned bore, are not capable of simply and inexpensively forming the eccentric annular surfaces such as a recess or an offset outer surface. The advantages, therefore, of automatic screw machines were not fully obtainable in fabricating parts of this type.

A need exists, therefore, for a device or tool and method of accurately and relatively inexpensively forming an eccentrically positioned bore or recess in a workpiece and which device is adapted for use in an automatic screw machine.

SUMMARY OF THE INVENTION

In accordance with the present invention this need is fulfilled. Essentially, the invention is an eccentric cutting tool which nonrotatably supports an orbiting cutting tool eccentric to the longitudinal axis of a workpiece. The device is adapted to be supported on an automatic screw machine tool holder and includes a cutting tool holder nonrotatably supported with respect to a workpiece. A housing is rotatably mounted with respect to the cutting tool holder. Means are provided for eccentrically positioning the cutting tool holder within the housing and causing the tool holder to orbit about the longitudinal axis of the workpiece upon rotation of the housing. In narrower aspects of the invention, provision is made for locking the housing to the workpiece so that it will automatically rotate therewith.

The method contemplated by the present invention includes the steps of rotating a workpiece about its longitudinal centerline, nonrotatably supporting a cutting tool coaxially with the axis of the annular surface to be formed and offset from the longitudinal axis of the workpiece and orbiting the cutting tool about the longitudinal axis of the workpiece.

BRIEF DESCRIPTION OF THE DRAWINGS

FIG. 3 is a cross-sectional view taken generally along line III—III of FIG. 2;

FIG. 7 is a cross-sectional view taken generally along line VII—VII of FIG. 3;

FIG. 8 is a cross-sectional view taken generally along line VIII—VIII of FIG. 3; and FIG. 9 is a cross-sectional view taken generally along line IX—IX of FIG. 3.

DETAILED DESCRIPTION OF THE PREFERRED EMBODIMENT

Figure 1:
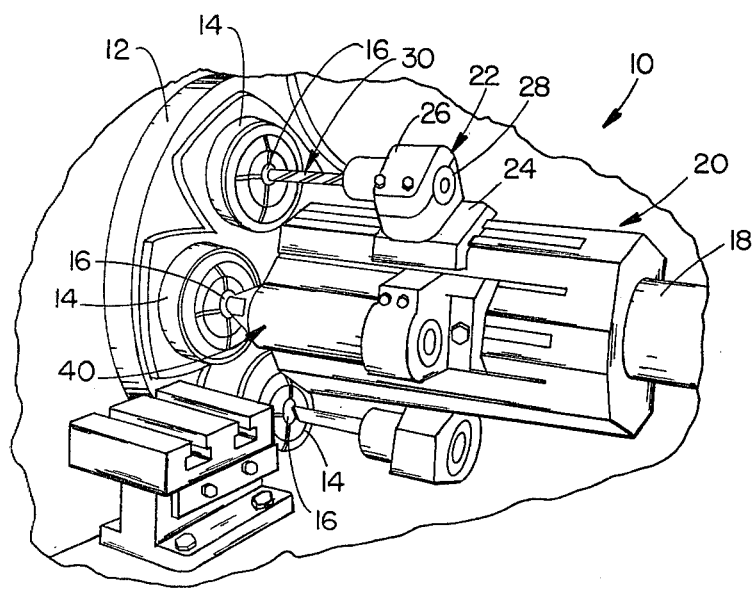
FIG. 1 is a fragmentary, perspective view of an automatic screw machine including an eccentric boring tool in accordance with the present invention.

A portion of an automatic screw machine for which the present invention is primarily adapted is illustrated in FIG. 1 and generally designated 10. The machine is conventional in nature and includes a spindle carrier 12 supporting a plurality of spindles 14 which are arranged in circumferentially spaced relationship around the carrier. Supported centrally of each spindle 14 are a plurality of generally cylindrical workpieces 16. A shaft 18 extends outwardly from the rotatable spindle carrier 12. Mounted for reciprocating movement on shaft extension 18 is a main tool slide 20. Positioned circumferentially around main tool slide 20 are a plurality of supports or tool holder subassemblies 22. Each holder 22 includes a slide portion 24 adjustably positioned on the main tool slide 20 through a tongue and groove dovetail type arrangement. A clamp structure 26 is carried by slide portion 24. Each clamp structure 26 includes a bore 28 which is coaxially aligned with spindles 14 and hence workpieces 16. Each holder 22 receives a suitable end working tool, such as a drill bit 30.

In operation, the spindle carrier 12 is locked in position and the main tool slide is moved towards the spindles. The workpieces are rotated and the tools supported on holders 22 are fed into the rotating workpieces to perform the machining operations. The main tool slide is then retracted and the spindle carrier indexed one stop. As a result, the various machining operations performed by the tools supported by holders 22 may be performed on each of the workpieces until a completely machined part is formed.

With automatic screw machines of the workpiece rotating type, the work is typically performed symmetrically about the end of the workpiece. As a result, with presently available tooling, eccentrically positioned annular surfaces including outside and inside surfaces such as apertures, bores, counterbores, recesses and projections cannot be machined on the workpiece. The present invention overcomes these problems.

Figure 2:
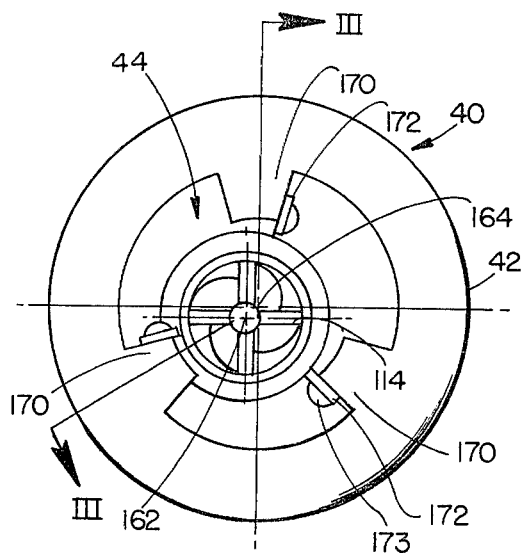
FIG. 2 is a front, elevational view of the eccentric boring tool in accordance with the present invention.
Figure 4:
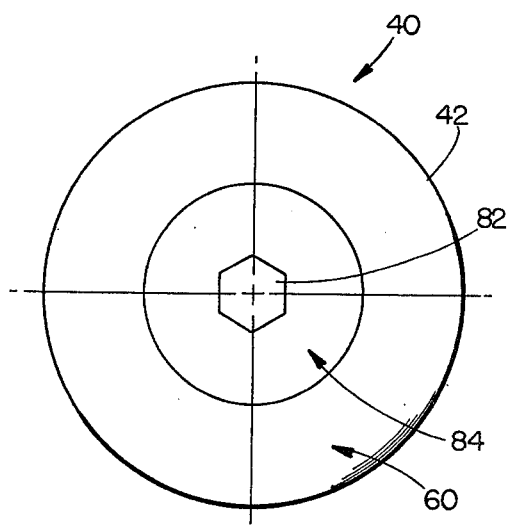
FIG. 4 is a rear, elevational view of the boring tool.

A preferred embodiment of an eccentric cutting tool especially adapted for boring in accordance with the present invention is illustrated in FIGS. 2, 3 and 4 and generally designated 40. Tool 40 includes a generally cylindrical, elongated outer housing 42 having an open forward end 44. Extending rearwardly from outer housing 42 is a generally tubular member or main shank 46. Tubular member 46 supports a pair of antifriction bearing assemblies 48 adjacent shoulder 50. Each bearing assembly 48 includes an inner race 52, an outer race 54 and a plurality of ball bearings 56. Outer races 54 support housing 42. The bearings 48, therefore, rotatably support the housing with respect to the elongated tubular member 46.

A flanged end bushing 60 includes a cylindrical hub portion 62 threaded at 64 and threadably engaging internal threads 66 formed on the inner peripheral surface of housing 42 at the rear end thereof. A slight clearance gap exists between the inside surface of through bore 63 in bushing 60 and the exterior of member 46 to allow bushing 60 to rotate with housing 42.

Member 46 is generally stepped in cross-sectional configuration, as best seen in FIG. 3. The forwardmost portion 70 of member 46 is externally threaded at 72. A retaining nut 74 is threadably mounted on portion 70. Retaining nut 74 engages washer 51 which, in turn, engages a face of inner race 52 of the forwardmost bearing assembly 48. Bushing 60, nut 74, and washer 51, as seen in FIG. 3, cooperate to capture the bearing assemblies 48.

Figure 5:
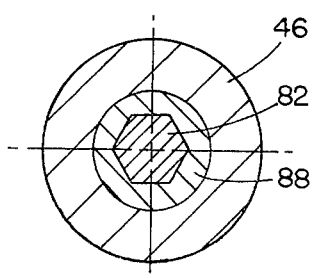
FIG. 5 is a cross-sectional view taken generally along line V—V of FIG. 3.
Figure 6:
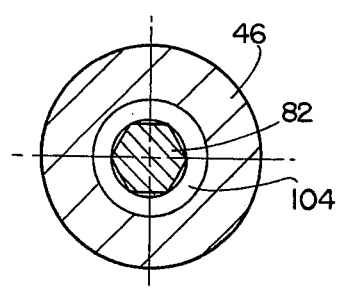
FIG. 6 is a cross-sectional view taken generally along line VI—VI of FIG. 3.

A cutting tool holder 80, as seen in FIG. 3, is nonrotatably supported within housing 42. Holder 80 includes an elongated, generally cylindrical shank portion 82. As best seen in FIGS. 3, 5 and 6, shank portion at its rear end is hexagonal in cross section. This noncircular cross-sectional portion of shank portion 82 is captured by a bushing 84 having a flanged portion 86 and a hub portion 88 pressed or otherwise non-rotatably secured within tubular member 46. Bushing 84 has a through passage or bore 90 having a configuration which conforms to the configuration of the outer surface of the rear portion of shank 82. This is clearly seen in FIGS. 4 and 5. As a result, shank 82 is nonrotatably supported with respect to member 46 and housing 42 may rotate relative to holder 80.

Secured to a threaded forward end portion 92 of shank 82 is a generally cylindrical, tubular socket 94. Socket 94 includes an elongated bore 96 and a counterbore portion 98. The rear portion of bore 94 is threaded along a length 100 to permit the socket to be threadably mounted on threaded portion 92 of shank 82. A lock nut 102 secures socket 80 in position. Placed between lock nut 102 and the forward end of member 46 is a spacer 104. Spacer 104 limits the rearward movement of holder 80 relative to tubular member 46 and housing 42 since it engages member 46.

Socket 94 nonrotatably supports and holds a cutting tool 110. Cutting tool 110 is a conventional end mill having cutting edges 112 around its periphery and cutting edges 114 (FIG. 2) on its end. Tool 110 is a straight shank spiral end mill including a cylindrical shank portion 116. A slot 118 is formed in shank 116. A set screw 120 threaded through a bore in socket 94 secured end mill 110 within the socket.

Provision is made for supporting end mill 110 so that its longitudinal axis is offset from the longitudinal axis of housing 42, tubular member 46 and hence the longitudinal axis of workpiece 16. In the preferred embodiment, as best seen in FIGS. 3 and 9, socket 94 is supported within housing 42 by an eccentric means generally designated 121. Eccentric means 121 includes a cup-shaped eccentric member 122. Member 122 includes a peripheral, generally cylindrical sidewall 124 and a base 126. Base 126 defines an eccentric or offset, circular aperture 128. As best seen in FIG. 9, sidewall 124 defines an eccentrically positioned recess 132 within which is disposed a ball bearing assembly 134. Sidewall 124, therefore, has a varying thickness. Bearing assembly 134 includes an outer race 136 which engages and rotates with the inner peripheral surface of wall 124. An inner race 138 is secured to the outer peripheral surface of socket member 94. Inner race 138 includes a cylindrical extension 140 (FIG. 3) through which a set screw 142 extends and engages the socket. A plurality of ball bearings 144 ride on races 136, 138.

Bearing assembly 134 is held in position relative to housing 42 by a spacer sleeve 150. Sleeve 150 engages the inner peripheral surface of housing 42 and the end face of race 54 of the forward bearing assembly 48 at its rear end. The forward end of spacer sleeve 150 includes an aperture base wall 152 which engages outer race 136 of bearing assembly 134. Housing 42 defines a shoulder 154 at its forwardmost end against which eccentric member 122 seats.

Eccentric means 121, as seen in FIGS. 2 and 9, positions socket 94 and hence cutting tool 110 offset or eccentrically with respect to the housing 42. Elongated shank portion 82 of holder 80 is sufficiently flexible due to its length to accommodate this offset by bending slightly in combination with the slight clearance between the end of shank 82 and passage 90 in bushing 84. Typically, shank 82 flexes between 0 and 0.020 inches with any further movement provided by the clearance in bushing 84. Preferably, shank 82 is made from medium carbon C-1144 stress-proof steel.

As is now apparent upon rotation of housing 42 relative to member 46, eccentric member 122 will rotate with the housing. Outer race 136 rotates with member 122 thereby causing socket 94 and hence tool 110 to orbit about the longitudinal centerline of housing 42. As illustrated in FIG. 9, longitudinal centerline 162 of tool 110 is offset or eccentric with respect to longitudinal centerline 164 of housing 42. In FIG. 2, the relative position of outer housing 42 and socket 94 has been illustrated rotated through an angle of 45° when compared with FIG. 9. This clearly illustrates the orbited motion of the longitudinal centerline of tool 110 upon rotation of housing 42.

Extending forwardly and angled slightly downwardly from the forward end 44 of housing 42 are a plurality of equally spaced arms 170. Supported on each arm 170 is a thin, radially positioned disc 172. The discs are rotatably supported in a radial position by pins or screws 173. Discs 172 are positioned along the same circle and are dimensioned to receive, engage, and bite into workpiece 16 extending into the open end of housing 42 and into contact with cutting tool 110. This is best seen in FIG. 3. Arms 170 and discs 172 capture the cylindrical bar stock workpiece 16 and lock the housing thereto.

OPERATION

In use, eccentric cutting tool 40 in accordance with the present invention is supported on a holder assembly 22 positioned on main tool slide 20 of the automatic screw machine 10. This is illustrated in FIG. 1. Elongated tubular member 46 defines a main shank which is held by the clamp portion 26 of the holder within bore 28. Tubular member 46 and hence housing 42 are thereby coaxially aligned with the bar stock workpiece 16. When the main tool slide is advanced toward the spindle carrier 16, the bar stock will enter the open forward portion of housing 42 and be engaged by discs 172. The discs will take a bite on the bar stock thereby locking the housing to the bar stock. Upon rotation of the workpiece 16 housing 42 will rotate at the same speed as the workpiece.

As the workpiece 16 rotates and cutting tool 110 is advanced against the workpiece, means 121 will maintain the longitudinal axis of cutting tool 110 offset from the longitudinal axis of piece 16. Cutting tool 110 is thereby maintained in alignment with the off center bore or recess to be formed in the rotating workpiece 16. Tool 110 will orbit about the longitudinal centerline of piece 16. The cutting tool will cut an off center or eccentrically positioned, circular or cylindrical bore into the end face of workpiece 16 which is at a very slight angle to the centerline of the workpiece. Tool 40, therefore, permits off center boring end work and other off center machining of bar stock at one station in an automatic screw machine in an efficient and relatively simple manner.

In a presently existing embodiment of the tool 40, in accordance with the present invention, housing 42, tubular member 46, holder 80, spacer 150, bushing 160 and bushing 84 are all fabricated by conventional machining techniques from steel. The total overall length of the tool 40 is approximately 12.9 inches. Housing 42 has an overall length of approximately 6 inches. The length of the housing assembly including the bushing 60 and the downwardly angled arms 170 is approximately 8.2 inches. The arms 170 extend downwardly from horizontal at an angle of 15°. Housing 42 has an outer diameter of 2.87 inches and an inner diameter of approximately 2.44 inches. The maximum diameter of the shoulder portion 154 defined by housing 42 is approximately 2.40 inches. The overall outer diameter defined by the forwardmost portion of arms 172 is 2 inches. Tubular member 46 has an overall length of 6.80 inches. The outer diameter of tubular member 46 is 1.50 inches and the inner diameter is 0.75 inches. Bushing 84 has an overall length of 0.80 inches and the flange portion 86 thereof has a thickness of 0.20 inches. Shank 82 has a maximum diameter of 0.50 inches and an overall length of 9.2 inches. Socket 94 has an outer diameter of 1.00 inch and an inner diameter along bore portion 96 of 0.50 inches. Sidewall 124 of eccentric means 121 has an eccentricity designated A in FIG. 9 of 0.062 inches. The socket accepts a straight shank spiral, end cutting, end mill having an outer diameter of 0.87 inches at its peripheral cutting surfaces.

In view of the foregoing description, it should now be readily apparent to those of ordinary skill in the art that the unique tool 40 and method of eccentric machining in accordance with the present invention provides significant advantages to the manufacturer. Tool 40 permits complete machining operations to be performed on workpieces which require off center machining of both inside and outside surfaces including boring or counterboring or forming of recesses therein. Additional machining steps such as drill press operations to form the bore or annular surface are eliminated. The tool, therefore, increases the versatility of presently available automatic screw machines. The device is easily and relatively inexpensively manufactured by conventional machining techniques from steel. Ball bearing assemblies 48 supporting housing 42 on main shank member 46 provide long life and reliability for the tool. Assembly 121 including ball bearing subassembly 134 also insures adequate reliability and tool life. Discs 172 rotatably mounted on pins 173 provide a simple and positive method of locking housing 42 to the rotating workpiece. The discs engage the workpiece automatically upon advancement of tool 40 towards the workpiece. Means 121 insure that the axis of the nonrotating end mill 110 is maintained in alignment with the off center bore machined in the rotating workpiece. Nonrotating cutting tool 110 efficiently and effectively mills an eccentrically located, off center bore in the end face of the workpiece. The length of the combined shank of the cutting tool and the shank 82 of the tool holder 80 provides sufficient flexing over the length of the tool 40 to allow the orbital movement of the cutting head. Shank 82 simplifies nonrotational mounting of tool 110.

Those of ordinary skill in the art will undoubtedly envision various modifications to the embodiment described which would not depart from the inventive concepts disclosed. For example, means other than the eccentric cup 122 and bearing 134 could be employed to eccentrically mount socket 94 of holder 80. For example, a hard, wear resistant, tungsten carbide bushing having an off center opening therein could be substituted for this subassembly with the bushing supporting the socket or directly contacting and supporting the tool 110. Such a carbide bushing would rotate with the housing and cause movement of the cutting tool in an orbital path upon rotation of the housing 42. The important considerations are the fixing the cutting tool for nonrotational movement while permitting orbital movement of the longitudinal axis of the tool to maintain it in alignment with the off center bore to be milled in the rotating workpiece. Further, means other than the discs 172 could be employed to lock the housing 42 to the rotating workpiece. For example, the points of set screws could be employed to secure the workpiece and housing. Also, other cutting tools can be used in the present invention such as hollow mills, trepanning tools, or the like, which allow machining of both inside and outside surfaces. Therefore, it is expressly intended that the above description should be considered as only that of the preferred embodiment. The true spirit and scope of the present invention may be determined by reference to the appended claims.

The embodiments of the invention in which an exclusive property or privilege is claimed are defined as follows.

1. An eccentric cutting tool for machining an annular surface having an axis off center from the central axis of a workpiece, said tool adapted for use in an automatic screw machine and comprising:
   an outer housing having an open forward end dimensioned to receive the workpiece;
   a tool holder supported within said housing;
   means engaging said housing for rotatably supporting said housing with respect to said tool holder;

means operatively connected to said housing for causing said housing to rotate with the workpiece;

means rotatable with said housing and supporting said tool holder for causing the longitudinal axis of said tool holder to be positioned eccentrically of the workpiece central axis, concentric with an axis of the annular surface to be machined and for causing the tool holder to orbit about the longitudinal axis of said outer housing without rotation of the tool holder about its longitudinal axis; and a cutting tool supported by and coaxially aligned with said tool holder whereby upon rotation of the outer housing the tool will orbit about the central axis of the workpiece and machine an annular surface in the workpiece upon relative axial movement of the workpiece and outer housing.

2. An eccentric cutting tool as defined by claim 1 wherein said tool holder comprises:
an elongated shaft; and
a socket member positioned on said shaft and defining a socket for receipt of the cutting tool.

3. An eccentric cutting tool as defined by claim 1 wherein said means rotatable with said housing comprises:
an outer race carried by said housing and secured thereto off center from the longitudinal centerline of said housing;
an inner race coaxial with said outer race and supporting said tool holder; and
a plurality of bearings between said inner and outer race.

4. An eccentric cutting tool for machining an annular surface off center from the center axis of a workpiece, said tool adapted for use in an automatic screw machine and comprising:
an outer housing having an open forward end dimensioned to receive the workpiece;
a tool holder supported within said housing;
means engaging said housing for rotatably supporting said housing with respect to said tool holder;
means rotatable with said housing and supporting said housing with respect to said tool holder;
means rotatable with said housing and supporting said tool holder for causing the longitudinal axis of said tool holder to orbit about the longitudinal axis of said outer housing;
a cutting tool supported by and coaxially aligned with said tool holder whereby upon rotation of the outer housing the tool will orbit about the central axis of the workpiece and machine an annular surface in the workpiece upon relative axial movment of the workpiece and outer housing; and
locking means at the forward end of said housing for locking said housing to the workpiece whereby rotation of the workpiece causes rotation of said housing.

5. An eccentric cutting tool as defined by claim 4 wherein said locking means comprises a plurality of radially positioned discs spaced equally around the circumference of said housing at the forward end thereof.

6. An eccentric cutting tool for machining an annular surface off center from the central axis of a workpiece, said tool adapted for use in an automatic screw machine and comprising:
an outer housing having an open forward end dimensioned to receive the workpiece;
a tool holder supported within said housing;
means engaging said housing for rotatably supporting said housing with respect to said tool holder;
means rotatable with said housing and supporting said tool holder for causing the longitudinal axis of said tool holder to orbit about the longitudinal axis of said outer housing;
a cutting tool supported by and coaxially aligned with said tool holder whereby upon rotation of the outer housing the tool will orbit about the central axis of the workpiece and machine an annular surface in the workpiece upon relative axial movement of the workpiece and outer housing; and
locking means at the forward end of said housing for locking said housing to the workpiece whereby rotation of the workpiece causes rotation of said housing.

7. An eccentric cutting tool as defined by claim 6 wherein said locking means comprises a plurality of discs spaced equally around the circumference of said housing at the forward end thereof.

8. An eccentric cutting tool as defined by claim 7 wherein said means rotatable with said housing comprises:
a member carried by said housing and defining an eccentrically positioned aperture;
an outer race disposed within said aperture of said member and having a rotational axis off center from the longitudinal centerline of said housing;
an inner race coaxial with said outer race and supporting said tool holder; and
a plurality of bearing between said inner and outer race.

9. An eccentric cutting tool as defined by claim 8 further including:
an elongated tube, said outer housing being rotatably mounted on said elongated tube by said means engaging said housing; and
an end bushing supported within said tube and having a noncircular passage therethrough, said elongated shaft nonrotatably extending through said passage and having a configuration conforming to said passage, said tube having an inner diameter greater than the outer diameter of said shaft to accommodate the slight flexing of said shaft as said tool holder orbits.

10. A device for holding a cutting tool and causing said cutting tool to orbit about the longitudinal axis of a rotating workpiece to thereby form a surface eccentric to the axis of the workpiece, said device comprising:
an elongated member including means for nonrotatably supporting said member within an automatic screw machine tool holder;
an elongated cutting tool holder including a shank and a socket configured to nonrotatably hold a cutting tool;
means engaging said shank for nonrotatably supporting said shank within said elongated member;
a housing having an open forward end;
bearing means for rotatably mounting the outer housing on said elongated member; and
eccentric means carried by said housing and supporting said socket for causing the longitudinal axis of the socket to orbit around the longitudinal axis of the housing without the socket rotating about its longitudinal axis when said housing is rotated.

11. A device as defined by claim 10 wherein said eccentric means comprises:

a bearing including an outer race and an inner race coaxial with respect to said outer race; and means rotatable with said housing and supporting said outer race offset from the longitudinal axis of said housing said inner race supporting said socket.

12. A device for holding a cutting tool and causing said cutting tool to orbit about the longitudinal axis of a rotating workpiece to thereby form a surface eccentric to the axis of the workpiece, said device comprising:

an elongated member adapted to be nonrotatably supported within an automatic screw machine tool holder;

an elongated cutting tool holder including a shank nonrotatably supported by said elongated member and a socket adapted to nonrotatably hold a cutting tool;

a housing having an open forward end;

bearing means for rotatably mounting the outer housing on said elongated member;

eccentric means carried by said housing and supporting said socket so that when said housing rotates, the longitudinal axis of the socket orbits around the longitudinal axis of the housing; and locking means carried by said housing at the forward end thereof for locking said housing to said workpiece and permitting relative axial movement of said housing relative to said workpiece.

13. A device as defined by claim 12 wherein said locking means comprises:

a plurality of radially oriented discs supported circumferentially around the open end of the housing.

14. A device as defined by claim 13 wherein said eccentric means comprises:

a bearing including an outer race and an inner race coaxial with respect to said outer race; and means rotatable with said outer housing and supporting said outer race offset from the longitudinal axis of said housing, said inner race supporting said socket.

15. A device as defined by claim 14 wherein said means rotatable with said housing comprises:

a generally cylindrical member having an eccentrically positioned bore within which is disposed said outer race, said bore having a central axis offset from the longitudinal axis of said outer housing, said cylindrical member thereby including a side wall having a varying thickness.

* * * * *

UNITED STATES PATENT AND TRADEMARK OFFICE
CERTIFICATE OF CORRECTION

PATENT NO. : 4,260,306
DATED : April 7, 1981
INVENTOR(S) : Siegfried K. Weis

It is certified that error appears in the above-identified patent and that said Letters Patent are hereby corrected as shown below:

Column 1, line 35:
"herewithin" should be --herewith in--

Column 4, line 52:
"position" should be --positioning--

Column 6, line 41:
After "fixing" insert --of--

Column 7, line 33, Claim 4:
"center" should be --central-- (second recitation)

Column 7, lines 41-42, Claim 4:
delete lines 41-42

Column 8, line 32, Claim 8:
"bearing" should be --bearings--

Signed and Sealed this

Eighth Day of September 1981

[SEAL]

Attest:

Attesting Officer

GERALD J. MOSSINGHOFF

Commissioner of Patents and Trademarks